US006935364B1

(12) United States Patent
Tarazona et al.

(10) Patent No.: US 6,935,364 B1
(45) Date of Patent: Aug. 30, 2005

(54) MAGNETICALLY-OPERATED RELIEF VALVES

(75) Inventors: Antulio Tarazona, Crawley (GB); John Cambridge Smith, Steyning (GB); Ian Currington, Horsham (GB)

(73) Assignee: The BOC Group plc, Windlesham (GB)

( * ) Notice: Subject to any disclaimer, the term of this patent is extended or adjusted under 35 U.S.C. 154(b) by 183 days.

(21) Appl. No.: 09/697,259

(22) Filed: Oct. 26, 2000

(30) Foreign Application Priority Data

Oct. 29, 1999 (GB) .................................... 9925648

(51) Int. Cl.⁷ ...................... F16K 17/02; F16K 31/08
(52) U.S. Cl. ...................... 137/529; 137/528; 251/65
(58) Field of Search .............................. 137/528, 529; 251/65

(56) References Cited

U.S. PATENT DOCUMENTS

| | | | | |
|---|---|---|---|---|
| 2,575,906 A | * | 11/1951 | Bullard | 137/528 |
| 2,597,952 A | * | 5/1952 | Rosenlund | 137/528 |
| 2,646,071 A | * | 7/1953 | Wagner | 137/528 |
| 2,949,931 A | * | 8/1960 | Ruppright | 137/528 |
| 3,026,903 A | * | 3/1962 | Roach | 137/533.13 |
| 3,189,675 A | * | 6/1965 | Moore et al. | 174/11 R |
| 3,409,038 A | * | 11/1968 | Blackford | 251/65 |
| 3,433,256 A | | 3/1969 | Stillhard et al. | 137/529 |
| 3,495,620 A | * | 2/1970 | Raimondi et al. | 137/529 |
| 3,891,000 A | * | 6/1975 | Melnick | 137/855 |
| 3,905,391 A | * | 9/1975 | Oakes | 137/855 |
| 4,273,153 A | * | 6/1981 | Brown | 137/529 |
| 4,275,759 A | * | 6/1981 | Huang | 137/528 |
| 4,349,042 A | * | 9/1982 | Shimizu | 251/65 |
| 4,392,632 A | * | 7/1983 | Gast et al. | 251/65 |
| 4,489,863 A | * | 12/1984 | Horchos et al. | 222/504 |
| 4,750,705 A | | 6/1988 | Zippe | 251/65 |
| 5,320,136 A | * | 6/1994 | Morris et al. | 251/65 |
| 5,323,809 A | * | 6/1994 | Tischer et al. | 251/51 |
| 5,445,184 A | * | 8/1995 | Racine et al. | 137/460 |
| 5,515,223 A | | 5/1996 | Grittmann et al. | 360/132 |
| 5,807,085 A | * | 9/1998 | Yajima | 417/505 |
| 6,000,417 A | * | 12/1999 | Jacobs | 251/65 |

FOREIGN PATENT DOCUMENTS

| | | | |
|---|---|---|---|
| DE | G 93 14 210.2 | 9/1993 | ............ F16K 15/04 |
| DE | 297 00 833 U1 | 1/1997 | ............ F16K 15/04 |
| EP | A1 0 273 614 | 9/1997 | ............ F16K 31/08 |
| WO | WO 98/57082 | 6/1998 | ............ F16K 31/08 |

OTHER PUBLICATIONS

European search report , Aug. 7, 2002.*

* cited by examiner

Primary Examiner—Ramesh Krishnamurthy
(74) Attorney, Agent, or Firm—Wan Yee Cheung; Philip H. Von Neida; Ira Lee Zebrak

(57) ABSTRACT

A valve comprising a housing having an inlet and spaced therefrom an outlet, a passageway extending between the inlet and the outlet, and a mechanism located in the passageway for controlling the flow of a fluid between the inlet and the outlet, the mechanism including a valve assembly movable between a first open position spaced from a cooperating valve seat and a second closed position at which the valve assembly sealingly engages the valve seat, in which the valve assembly is biased towards the second closed position using a magnet-operated mechanism.

10 Claims, 1 Drawing Sheet

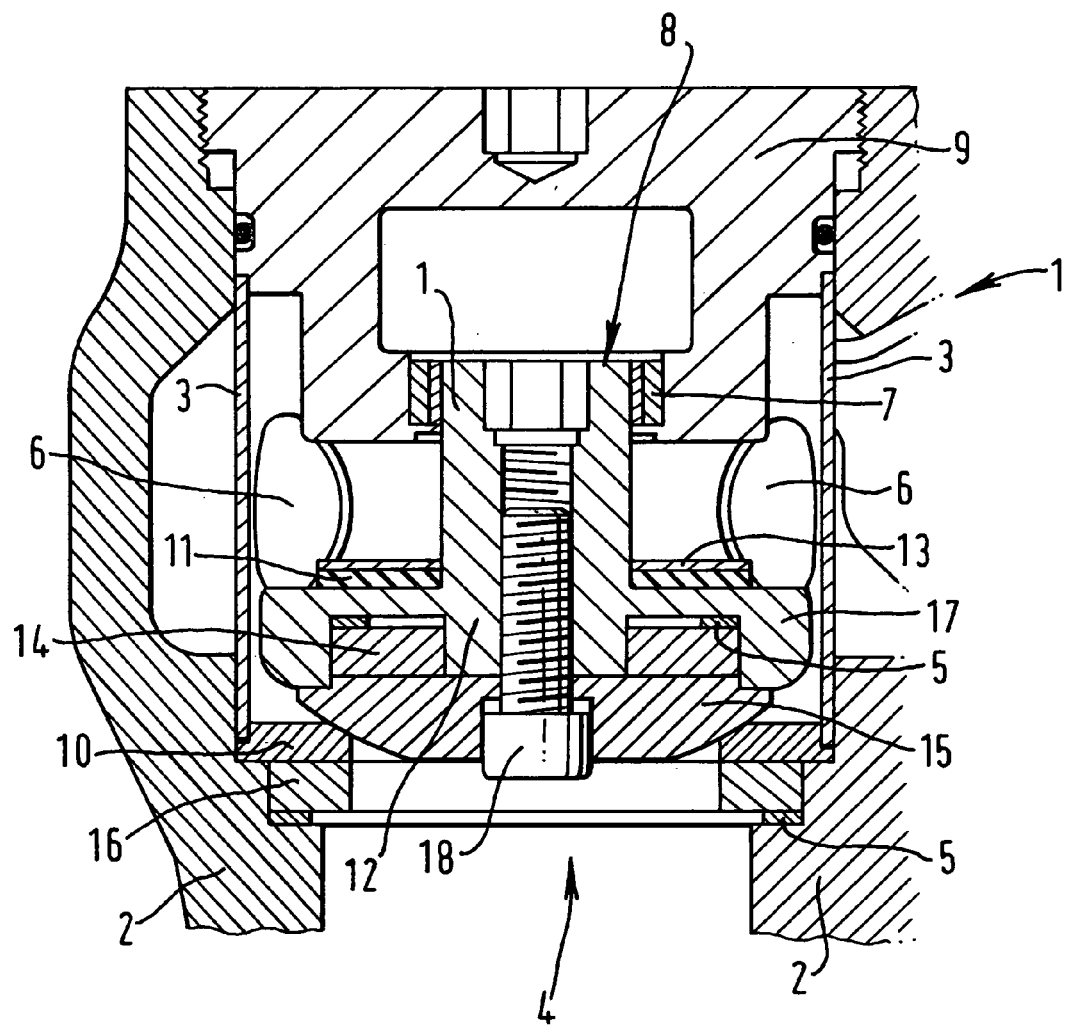

MAGNETICALLY-OPERATED RELIEF VALVES

FIELD OF THE INVENTION

The present invention relates to valves and in particular to pressure relief valves.

BACKGROUND OF THE INVENTION

It is known, for example, to locate a pressure relief valve between high and low pressure regions in a pneumatic or vacuum system such valves are actuated at a predetermined differential pressure to relieve the high pressure either to the low pressure region or to atmosphere. This known type of pressure relief valve uses either a spring or sometimes gravity alone to bias a valve stem towards a co-operating valve seat to maintain the valve in a normally closed position.

When this type of valve is required to operate free of oscillations it is common practice to incorporate a damping mechanism. The damping mechanism requires components which are manufactured to close tolerances and in environments where condensation and/or solid deposition may be formed within the valve this presents a risk of malfunction particularly with a spring-biased mechanism.

SUMMARY OF THE INVENTION

It is an aim of the present invention to provide a valve which incorporates a magnetic means for biasing the valve towards its closed position and which operates substantially free of oscillations while maintaining large internal clearances. This permits the valve to operate in environments where condensation and/or solid deposition may occur.

According to the present invention, a valve comprises a housing having an inlet and spaced therefrom an outlet, a passageway extending between the inlet and the outlet and means located in the passageway for controlling the flow of a fluid between the inlet and the outlet, the means including a valve assembly movable between a first open position spaced from a co-operating valve seat and a second closed position at which the valve assembly sealingly engages the valve seat, in which magnetic means is provided for biasing the valve assembly towards the second closed position.

In a preferred embodiment, at least a portion of the valve assembly is in the form of or incorporates a permanent magnet and a further magnet is located adjacent the valve seat. The further magnet may be a permanent magnet or alternatively an electromagnet.

BRIEF DESCRIPTION OF THE DRAWINGS

An embodiment of the invention will now be described, by way of example only, reference being made to the accompanying drawing which is a cross-section of a pressure relief valve according to the present invention.

DETAILED DESCRIPTION OF THE INVENTION

As shown, a pressure relief valve 1 includes a housing 2 having an inlet 4 and spaced therefrom an outlet 6. Located in the passageway extending between the inlet 4 and the outlet 6 is means including a valve assembly 8 and a co-operating valve seat 10 for controlling the flow of a fluid, for example a gas between the inlet 4 and said outlet 6.

The valve assembly 8 depends from a valve cap 9 of magnetic material which is sealingly engaged in the upper (as shown) end of the housing 2. Surrounding that portion of the valve assembly 8 within the valve cap 9 is a polymer bush 7.

The valve stem assembly 8 includes a valve stem 12 from which extends radially outwardly therefrom a recessed flange 17. Resting on the upper surface of the recessed flange 17 and surrounding the valve stem 12 are a polymer shock absorber 11 and a magnetic stainless steel washer 13.

Attached to the lower (as shown) end of the recessed flange 17 by means of a fastener 18 is a spherical seal pad 15 and located within the recessed flange 17 above the spherical seal pad 15 is a permanent magnet 14 mounted against a mounting aid 5.

The valve seat 10 is made from magnetic material and adjacent the valve seat on that side of the valve seat opposite the spherical seal pad 15 is a magnet 16 also mounting against a mounting aid 5. The magnet 16 may be in the form of a permanent magnet or alternatively an electromagnet.

As shown, a magnetic stainless steel sleeve 3 depends from the valve cap 9 and surrounds the valve assembly 8.

The pressure relief valve 1 operates between two stable positions, namely fully shut and fully open. With the valve 1 in its fully shut position as shown, fluid is prevented from flowing through the passageway between the inlet 4 and the outlet 6 of the housing 2 since the spherical seal pad 15 sealingly engages the valve seat 10. The valve 1 will remain shut until the pressure differential between the inlet 4 and the outlet 6 increases to such an extent that an upward (as shown) force is produced on the spherical sealing pad 15 which overcomes both the attractive force between the magnet 16 and the magnet 14 and the weight of the valve assembly 8. If the upward force produced by the pressure differential equals or surpasses the magnetic force and the weight of the valve assembly 8 then the spherical seal pad 15 separates from the valve seat 10 to allow the passage of gas from the inlet 4 to the outlet 6.

The magnetic force between the spherical seal pad 15 and the valve seat 10 is adjusted to provide a force greater than the weight of valve assembly 8 such that when the pressure differential causes the spherical seal pad 15 to separate from the valve seat 10, thus cancelling the magnetic force, the valve assembly 8 is lifted clear. The gas flow between the flange 17 and the sleeve 3 produces an upward force greater than the weight of the valve assembly 8 propelling it towards the fully open position against the top cap 9.

With the valve 1 fully open there are three forces involved, namely the weight of the valve assembly 8, the force produced by the pressure differential across the recessed flange 17 and the magnetic force produced by the magnet 14 and the magnetic top cap 9. The magnetic force is adjusted to less than the weight of the valve assembly 8 by the relative positions of the magnet 14 and magnetic washer 13 to the valve top cap 9. This bridge could also be produced by incorporating an electromagnet within or on the top cap 9.

When the force produced by the pressure differential between the flange 17 and the magnetic sleeve 3 is reduced the magnetic force cannot support the weight of the valve assembly 8 allowing it to lose contact with the top cap 9. The magnetic force between the valve assembly 8 and the top cap 9 becomes negligible as the valve assembly 8 falls downwards on the reduced gas glow until the closing magnetic force shuts the spherical seal pad 15 and the valve seat 10.

The pressure differential to initiate the opening by overcoming the magnetic force is greater than the pressure to move the valve assembly 8 to its fully open position. Similarly, the lower pressure differential required to initiate the closing by allowing the weight to overcome the magnetic force is lower than the pressure differential to keep the valve assembly 8 open and is not sufficient to support the weight of the valve assembly 8. This allows a free fall of the valve assembly 8 to the shut position.

The larger open and lesser closing pressure differentials are separated sufficiently to give a large hysteresis to prevent interactions between opening and closing as well as possible instability.

The shock absorber 11 provides a cushioning effect on the top surface of the valve stem assembly 8 to prevent or minimise valve flutter.

The polymer bush 7 protects the performance of the valve 1 in hostile-environments by preventing deposition or corrosion on the sliding surfaces of the top cap 9 and the stem 12 of the valve assembly 8. The main function of the magnetic sleeve 3 is to provide outlet ports and to keep the valve within predetermined boundaries. The fact that it is made from magnetic material prevents any lateral instability by biasing the valve assembly 8 towards the nearest point of the sleeve 3.

The spherical seal pad 15 and the valve seat 10 geometry are arranged such that irrespective of the attitude or eccentricity of the valve assembly 8 in the magnetic sleeve 3 sealing is achieved by toppling onto the valve seat 10 without the necessity of laterally centralising by sliding.

The magnetic mounting aids 5 can be in the form of a wavy washer or polymer that absorbs any sudden shock or vibration thereby preventing damage to the permanent magnets 14, 16 which are usually brittle.

A particular advantage of the above described valve 1 is that the said valve opens at a predetermined pressure differential and remains open with a much lower pressure because once the valve assembly 8 has moved away from the valve seat 10 the magnetic force is reduced significantly. Furthermore, the combination of magnets, magnetic and non-magnetic materials along with the weight of the valve assembly 8 allows the user to tune easily the operating range. This is accomplished by selecting the relative position of the permanent magnets 14, 16 and their contact area which forms the actual sealing surface between the valve assembly 8 and the valve seat 10.

We claim:

1. A valve comprising a housing having an inlet and spaced therefrom an outlet, a passageway extending between the inlet and outlet, and means located in the passageway for controlling the flow of a fluid between the inlet and the outlet, the means including a valve assembly movable in a direction along a longitudinal axis of a co-operating valve seat between a first open position spaced from the co-operating valve seat and a second closed position at which the valve assembly sealingly engages the valve seat, in which magnetic means is provided for biasing the valve assembly towards the second closed position; wherein at least a portion of the valve assembly is in the form of or incorporates a permanent magnet and a further magnet is located adjacent the valve seat, and said valve assembly is configured to transition between said second closed position and said first open position based on pressure differential arising from said fluid between said inlet and said outlet, and wherein the valve assembly depends from a valve cap made from magnetic material.

2. The valve as claimed in claim 1 in which the further magnet is a permanent magnet.

3. The valve as claimed in claim 1 in which the further magnet is an electromagnet.

4. The valve as claimed in claim 1 in which the valve seat is made of magnetic material.

5. The valve as claimed in claim 1 in which the valve assembly includes a spherical seal pad which sealingly engages the valve seat in the second closed position of the valve assembly.

6. The valve as claimed in claim 1 in which the valve cap is sealingly attached to the housing.

7. The valve as claimed in claim 6 in which an electromagnet is incorporated within or on the valve cap.

8. The valve as claimed in claim 6 in which a magnetic sleeve depends from the valve cap and surrounds the valve assembly.

9. The valve as claimed in claim 6 in which the valve assembly includes a shock absorber.

10. The valve as claimed in claim 8 in which a polymer brush is provided which surrounds that portion of the valve assembly within the valve cap.

* * * * *